April 14, 1959  G. B. R. FEILDEN  2,881,972
PRESSURE CHARGERS FOR INTERNAL COMBUSTION ENGINES
Filed Sept. 12, 1955
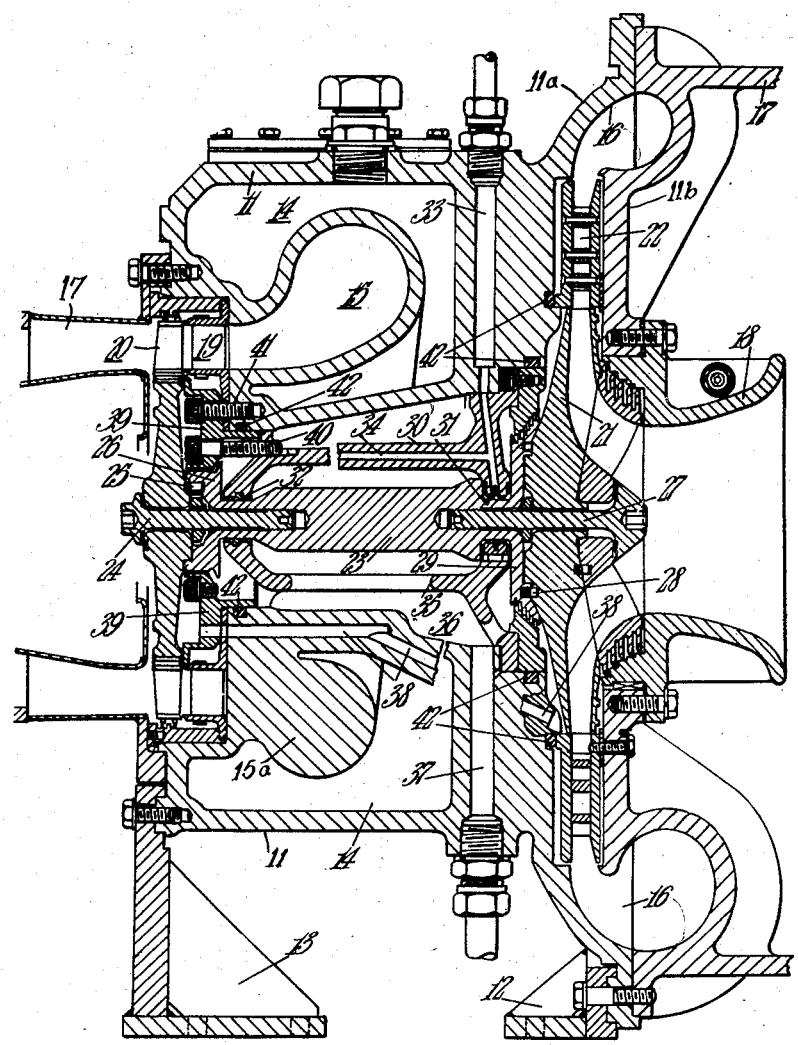
Inventor
Geoffrey B. R. Feilden
By Ralph B. Stewart
Attorney

United States Patent Office 2,881,972
Patented Apr. 14, 1959

2,881,972

PRESSURE CHARGERS FOR INTERNAL COMBUSTION ENGINES

Geoffrey B. R. Feilden, Lincoln, England, assignor to Ruston & Hornsby Limited, Lincoln, England, a British company Application September 12, 1955, Serial No. 533,570

Claims priority, application Great Britain September 17, 1954

4 Claims. (Cl. 230—116)

This invention relates to pressure chargers for internal combustion engines; and is described in the following description which relates to the accompanying drawing. In this drawing there is shown, by way of example only, a diametral section through a pressure charger embodying the invention.

In the drawing, a main casing 11 is mounted by means of fore and aft brackets 12 and 13 on a base not shown, which may be the internal combustion engine itself. The casing 11 is of the general form of a hollow toroid formed in a single piece and containing an annular space 14 for cooling water surrounding a turbine volute 15 located within the hollow toroid. The casing 11 is made in a single piece and is not split as are certain other parts to be described hereinafter. Preferably, the central opening in the casing is of conical form as shown in the drawing with the large end facing forward. The forward end of the casing 11 is an enlarged flange 11a in which is formed part of the compressed air outlet volute 16. The remainder of this volute is formed in an annular cover piece 11b secured to the outer face of the flange 11a. On the rear end of the casing 11 is bolted a turbine outlet diffuser 17, and an air inlet duct 18 is bolted to the annular cover piece 11b at the forward end of the casing.

A turbine, operated by exhaust gases flowing in from a compression-ignition engine through the turbine inlet volute 15 and out through the turbine outlet diffuser 17, consists of a statior 19 mounted in the main casing 11 adjacent the inlet volute 15, and a rotor 20 immediately adjacent the stator 19 on the rearward side thereof. A centrifugal blower, receiving air from the atmosphere via the air inlet duct 18, and delivering it at a higher than atmospheric pressure to the outlet volute 16, consists of a rotor or impeller 21 within an annular stator 22. A baffle or splitter 15a is provided between the two symmetrical halves of the volute 15 in order to keep the exhaust gas flow from each cylinder bank substantially separate when said volute 15 is fed from two exhaust pipes each conveying exhaust gas from individual banks of engine cylinders.

The two rotors, the turbine rotor 20 and the compressor rotor 21, are mounted upon a common shaft 23; the turbine rotor 20 having a fixing bolt 24 extending forwardly into the rear of the common shaft 23, and having pins 25 set into a flange 26 formed integrally on the rear of the common shaft 23; and the compressor rotor 21 having a fixing bolt 27 extending rearwardly into the front of the common shaft 23, and having pins 28 set into a flange 29 formed integrally on the front of the common shaft 23.

The common shaft 23 is rotatably mounted within a cartridge 30 upon fore and aft bearings 31 and 32. A lubricating system for the bearings 31 and 32 comprises oil passages 33 in the main casing 11 and 34 in the cartridge 30. In the bottom side of the cartridge 30 is a large oil-clearance hole 35, so that oil can drain freely into the well 36 in the main casing 11 and hence away through the passage 37.

Through a passage 38 formed in the main casing 11, cooling air can flow from the compressor 21, 22, to cool the turbine rotor 20.

The cartridge 30 is in two parts, being split along a horizontal axial plane; it will be appreciated that this joint does not have to be oil-tight. Likewise the elements constituting the bearings 31 and 32 are in semi-cylindrical halves. This construction permits the use of bearings at 31 and 32 of smaller diameter than the main or central portion of shaft 23 and smaller than the two flanges 26 and 29 at the ends of the shaft.

The rear end of cartridge 30 is secured within the main casing 11 by a separate disc 39 and by an inner ring of bolts 40 securing said disc 39 to the cartridge 30 and an outer ring of bolts 41 securing said disc 39 to the main casing 11.

Rubber sealing rings 42 prevent egress of oil and ingress of air or hot gas.

One of the features of this invention relates to the mode of assembling and dismantling the equipment. This can best be understood from an explanation of the procedure to be followed in dismantling. Firstly the exhaust gas outlet diffuser 17 is unbolted from the main casing 11 and removed rearwardly. Then the turbine rotor 20 is slid out in a rearward direction, taking its fixing bolt 24 with it. The bolts 40 of the inner ring are loosened up to release the cartridge 30. The air inlet duct 18 is unbolted from the main casing 11 and removed forwardly. Finally, the rotor bearing sub-assembly, consisting of the cartridge 30 and the common shaft 23, and including compressor rotor 21, is removed in the forward direction. The upper half of cartridge 30 and the upper halves of the bearings 31 and 32, can then be removed to expose the rotor common shaft 23.

What I claim is:

1. A turbine-driven pressure charger comprising a main casing of the form of a hollow toroid, a rotor shaft carrying a turbine rotor at one end and a compressor rotor at the other end, said shaft having enlarged flanges formed integrally therewith adjacent the inner faces of said rotors, means removably securing said rotors to the outer faces of said flanges, and means for mounting said shaft within the central opening of said main casing comprising a cartridge casing of substantially conical shape surrounding said shaft between said flanges and bearings provided for supporting said shaft at the ends of said cartridge of a smaller diameter than the diameter of said flanges, said cartridge and said bearings being split along a common plane which includes the axis of said shaft, a laterally extending flange on said cartridge casing, threaded openings in said flange, and bolts extending through openings in fixed parts of the main casing and into threaded engagement with said threaded openings for detachably supporting the cartridge within the main casing.

2. A turbine-driven pressure charger according to claim 1 wherein said main casing contains a turbine inlet volute surrounded by an annular space within said main casing for cooling water.

3. A turbine-driven pressure charger according to claim 1 and including means providing a passage for lubricating fluid through said main casing and through the walls of said cartridge to said bearings.

4. A turbine-driven pressure charger according to claim 1 and including means providing a passage within said main casing for conducting cooling air from a pressure zone of said compressor to cool the turbine rotor.

References Cited in the file of this patent

UNITED STATES PATENTS

| | | |
|---|---|---|
| 704,038 | Hope | July 8, 1902 |
| 743,693 | Davidson | Nov. 10, 1903 |
| 2,117,131 | Auger | May 10, 1938 |
| 2,492,672 | Wood | Dec. 27, 1949 |
| 2,577,134 | Land | Dec. 4, 1951 |
| 2,577,179 | Buchi | Dec. 4, 1951 |
| 2,646,210 | Kohlmann | July 21, 1953 |
| 2,684,196 | Wood | July 20, 1954 |

FOREIGN PATENTS

| | | |
|---|---|---|
| 630,842 | Great Britain | Oct. 21, 1949 |